United States Patent [19]

Hellman, Sr.

[11] Patent Number: 5,445,361

[45] Date of Patent: Aug. 29, 1995

[54] FLUID FLOW VALVE

[75] Inventor: Robert R. Hellman, Sr., 35 Hawley Rd., Oxford, Conn. 06483

[73] Assignee: Robert R. Hellman, Sr., Oxford, Conn.

[21] Appl. No.: 229,765

[22] Filed: Apr. 19, 1994

[51] Int. Cl.$^6$ ............................................. F16K 1/52
[52] U.S. Cl. .................................... 251/205; 251/121
[58] Field of Search ............... 251/205, 122, 206, 207, 251/209, 121; 137/625.3, 625.28

[56] References Cited

U.S. PATENT DOCUMENTS

| | | | |
|---|---|---|---|
| 3,426,801 | 2/1969 | Curran | 137/625.3 X |
| 3,428,086 | 2/1969 | Glasgow | 137/625.3 |
| 3,752,188 | 8/1973 | Sage | 137/625.3 X |
| 3,771,554 | 11/1973 | Hassall | 137/625.3 X |
| 3,997,141 | 12/1976 | Baumann | 251/205 |
| 5,090,450 | 2/1992 | Pelech et al. | 137/625.3 |

Primary Examiner—Martin P. Schwadrow
Assistant Examiner—Kevin L. Lee
Attorney, Agent, or Firm—John H. Crozier

[57] ABSTRACT

In a preferred embodiment, a fluid flow valve, including: an elongate body having an axially extending cavity defined therethrough and having fluid inlet and outlet ports; a hollow seat assembly disposed in the body for the passage therethrough of a fluid; a shaped first aperture defined through a wall portion of the seat assembly; and a plug selectively axially moveable in the hollow seat assembly and along the shaped first aperture such that the fluid flows into the hollow seat assembly, upwards past the plug into the first aperture, through the first aperture, downwards past the plug, and out of the hollow seat assembly, the position of the plug along the aperture determining rate of flow of the fluid through the valve.

12 Claims, 3 Drawing Sheets

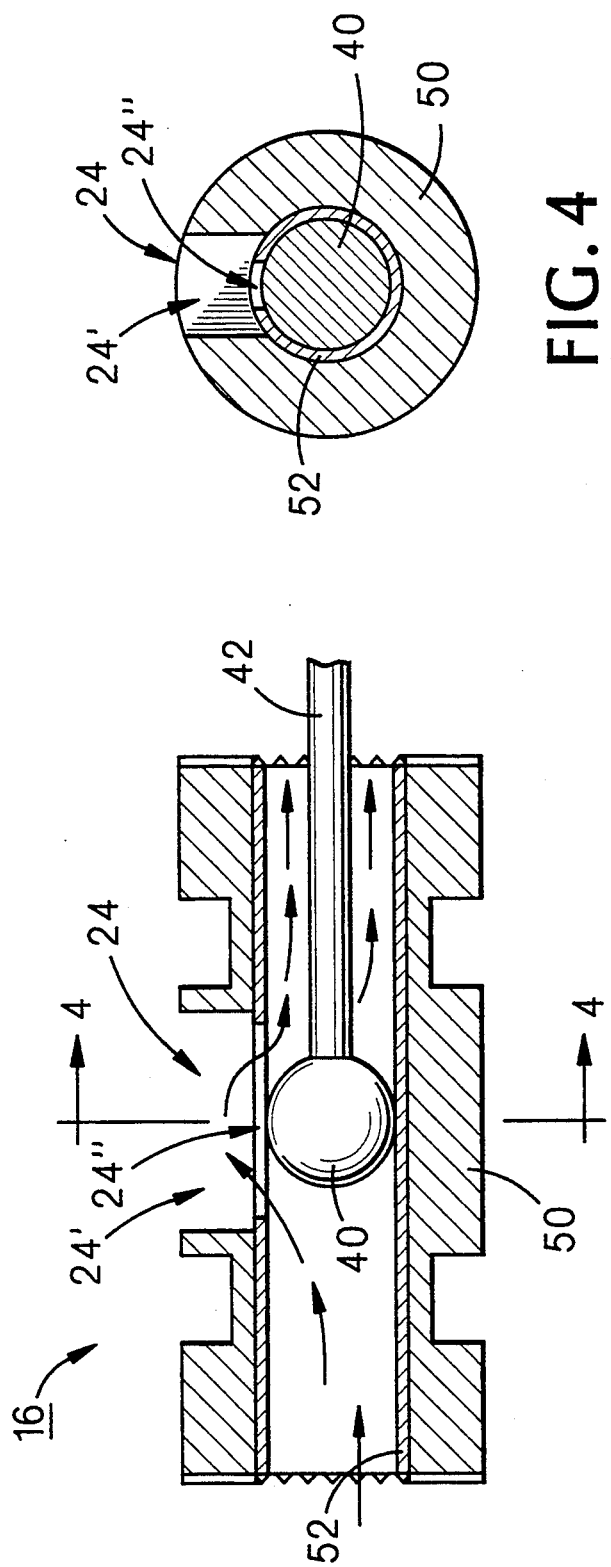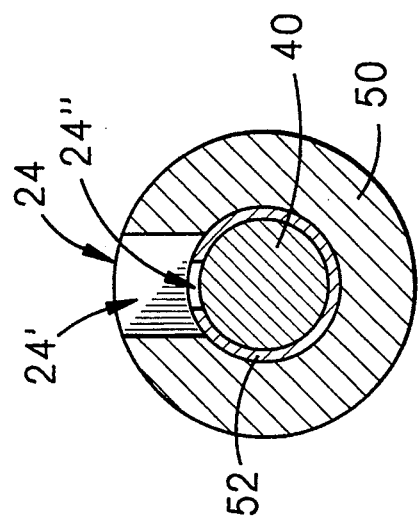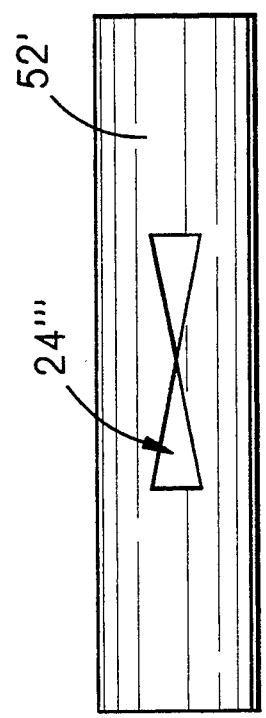

FLUID FLOW VALVE

BACKGROUND OF THE INVENTION

1. Field of the Invention

The present invention relates to valves for adjusting the rate of flow of fluids generally and, more particularly, but not by way of limitation, to a novel fluid flow valve that can that be designed to exhibit a selected one of a variety of response characteristics, which characteristic can easily be modified, including reversing the action of the valve.

2. Background Art

Fluid flow valves are ancient and are used for controlling the flow of many different fluids in a wide variety of applications. Each type of valve has its own flow response characteristics which can be modified somewhat, but in which major changes cannot be made. For example, gate, butterfly, and various types of plug valves have fairly good flow control characteristics when nearly closed, but, when opened to around one-quarter or more of full opening, the flow control response degrades considerably. Globe-type valves offer fairly good flow control response over a wider range, but even that is far from linear.

Accordingly, it is a principal object of the present invention to provide a fluid flow valve which can be designed to exhibit a selected flow response characteristic.

It is a further object of the invention to provide such a fluid flow valve in which the flow response characteristic can easily be modified.

It is an additional object of the invention to provide such a fluid flow valve in which the action of the valve can easily be reversed.

It is another object of the invention to provide such a fluid flow valve which can be economically manufactured.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a fluid flow valve, comprising: an elongate body having an axially extending cavity defined therethrough and having fluid inlet and outlet ports; a hollow seat assembly disposed in said body for the passage therethrough of a fluid; a shaped first aperture defined through a wall portion of said seat assembly; and plug means selectively axially moveable in said hollow seat assembly and along said shaped first aperture such that said fluid flows into said hollow seat assembly, upwards past said plug means into said first aperture, through said first aperture, downwards past said plug means, and out of said hollow said seat assembly, the position of said plug means along said aperture determining rate of flow of said fluid through said valve.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 3 is a fragementary, side elevational view, partially in cross-section, of the fluid flow valve in use.

FIG. 4 is an end elevational view, in cross-section, taken along line "4—4" of FIG. 3.

FIG. 5 is a top plan view of an alternative seat aperture for the valve.

DETAILED DESCRIPTION OF THE PREFERRED EMBODIMENTS

Figure 1:
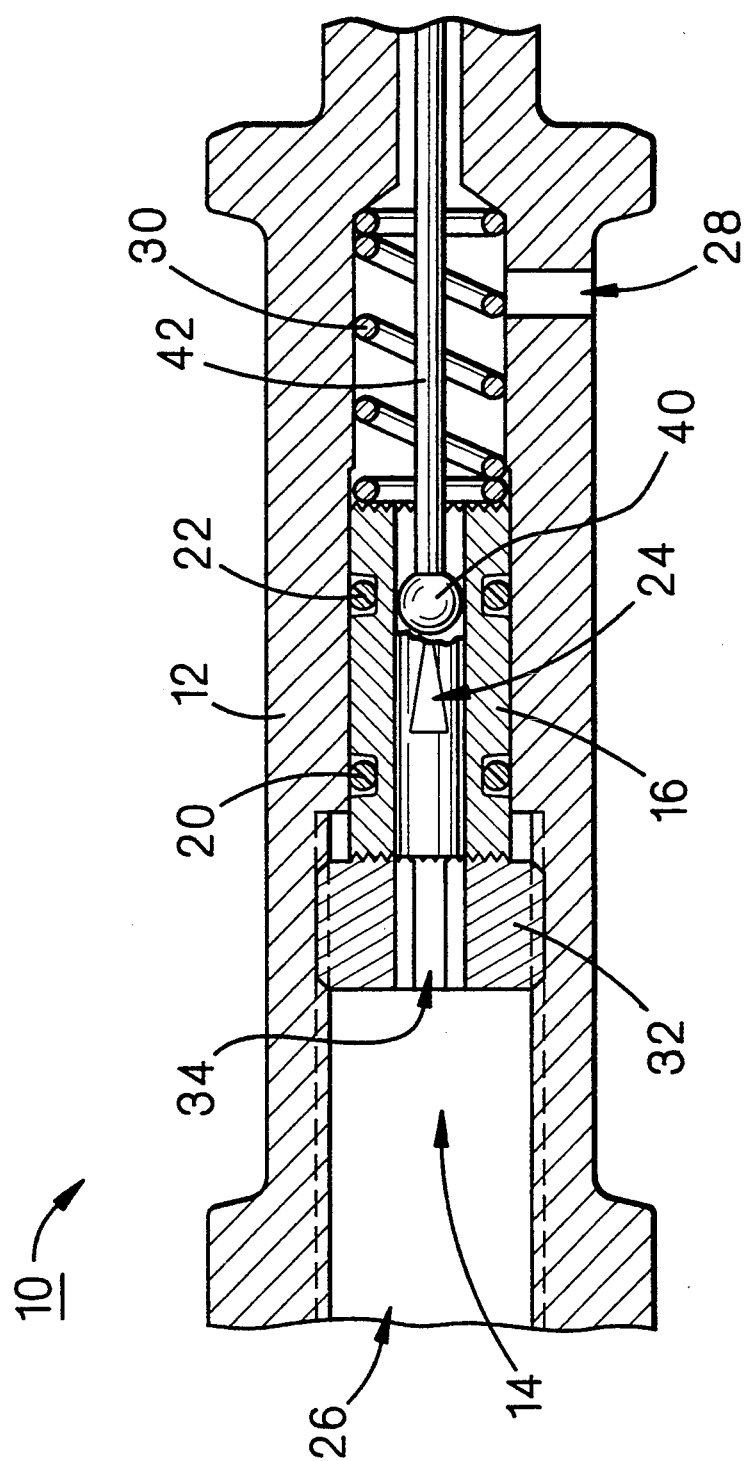
FIG. 1 is a top plan view, partially in cross-section and partially cut-away, of a fluid flow valve constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a fluid flow valve, generally indicated by the reference numeral 10, constructed according to the present invention. Valve 10 includes an elongate body 12 having an axially extending cavity 14 defined therethrough. Disposed in a medial portion of cavity 14 is a hollow, cylindrical seat assembly 16 having O-rings 20 and 22 disposed in the outer peripheral surface of the seat assembly to seal the seat assembly against the inner peripheral surface of the cavity on either side of a seat aperture 24 defined in the seat assembly.

Valve body 12 includes inlet/outlet ports 26 and 28 defined therethrough for the ingress and egress of a fluid, the rate of flow of which is controlled by valve 10.

Seat assembly 16 is axially moveable in cavity 14 and is held in a selected position within the cavity between a spring 30 compressed between a first end of the cavity and a first end of the seat assembly and an adjustment screw 32 bearing against a second end of the seat assembly. Adjustment screw 32 is threadedly engaged in a portion of cavity 14 so that its axial position therein may be selectively adjusted to thereby adjust the axial position of seat assembly 16. Adjustment screw 32 has an axially extending channel 34 defined therethrough, the channel having a hexagonal configuration to accept therein a similarly configured end of an adjusting wrench (not shown). The contacting inner face of adjustment screw 32 and the second end of seat assembly 16 are serrated and the first end of the seat assembly bearing against spring 30 is serrated to secure the adjustment screw and seat assembly in place against vibration and other mechanical forces which might otherwise tend to change the axial positions of the adjustment screw and the seat assembly.

Disposed within seat assembly 16 is a close fitting ball plug 40 fixedly attached to an actuating rod 42 which extends from one end of body 12. FIG. 1 illustrates valve 10 in closed position, with ball plug 40 sealing the channel in seat assembly 16. As will be described later, the rate of fluid flow through valve 10 is determined by axially moving ball plug 40 within the channel in seat assembly 16 to selectively position the ball plug in seat aperture 24.

Means of attachment of inlet/outlet ports 26 and 28 to external conduits are not shown, as such can be any conventional means known in the art. Likewise, the means of axially moving rod 42 to effect axial movement of ball plug 40 is not shown, as such can be any conventional means known in the art, including manual means and automatic means such as mechanical, electromechanical, and thermal actuating devices.

Figure 2:
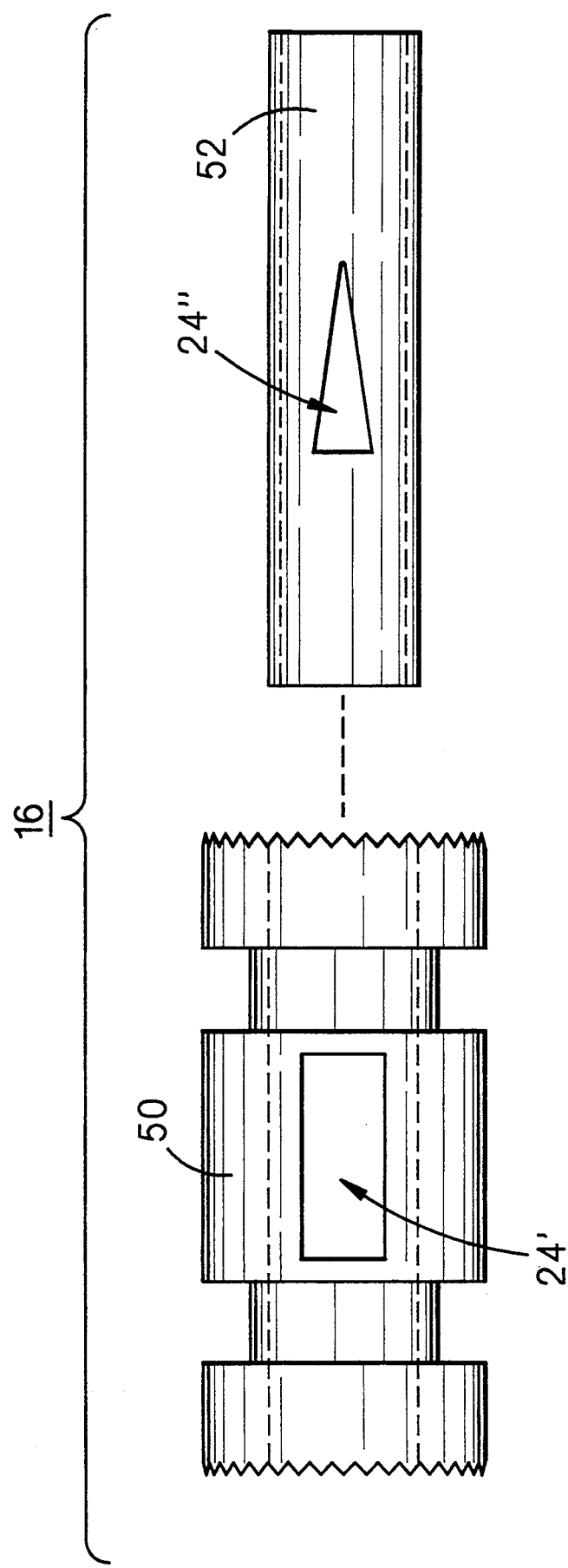
FIG. 2 is an exploded, top plan view of the seat assembly of the fluid flow valve.

FIG. 2 illustrates seat assembly 16 which, as can be seen from the figure, comprises nestable outer and inner cylindrical shells 50 and 52. It will be understood that, in use, inner shell 52 is inserted in outer shell 50. Also, it can be seen that seat aperture 24 (FIG. 1) comprises an aperture 24' defined through outer shell 50 and an aperture 24" defined through inner shell 52. When shells 50 and 52 are assembled, apertures 24' and 24" will be aligned to form aperture 24. Seat assembly 16 may also be formed from a single cylindrical shell with a single aperature, depending on the size of valve 10 and the degree of flow control accuracy required. As will be seen later, a fair degree of wall thickness is required for seat assembly 16 and, especially when a high degree of precision in adjustability of fluid flow rate is required, the arrangement illustrated is preferred. Here, inner shell 52 is relatively thin and, consequently, aperture 24" can be relatively easily cut by high precision techniques such as laser machining. Aperture 24' in relatively thick outer shell 50 can be cut or punched by an inexpensive and less accurate method, since aperture 24' extends beyond the outer limits of aperture 24".

Inner and outer shells 50 and 52 may be joined by any suitable method depending on the fluids to be contacted by valve 10.

Reference should now be made to FIGS. 3 and 4 together for further understanding of the construction of seat assembly 16 and the function of ball plug 40. Here, ball plug 40 has been positioned approximately at the midpoint of aperture 24". Remembering that seat assembly 16 is sealed against the inner perpheral surface of cavity 14 (FIG. 1), fluid flows into inner shell 52, up past ball plug 40 into aperture 24, through that aperture, down past the ball plug, and out of the inner shell, as indicated by the arrow paths. This flow pattern assumes that the fluid enters valve 10 (FIG. 1) through inlet/outlet port 26 and exits the valve through inlet/outlet port 28, although the flow path can be reversed, if desired. Moving ball plug 40 towards the narrow end of aperture 24" (FIG. 2) will, of course, result in decreasing flow, while moving the ball plug towards the wide end of that aperture will result in increasing flow. As was indicated on FIG. 1, moving ball plug 40 out of the aperture results in stopping the flow of fluid.

Proper selection of the shape of aperture 24" will give a completely flat flow response characteristic or any other desired shape flow response characteristic, with virtually no resonance. Such selection can be made by simply trial and error procedures or by calculation of the necessary shape using techniques known in the field of fluid mechanics.

More complex flow response characteristics can also be achieved. FIG. 5 illustrates an inner shell 52' having defined therethrough an aperture 24'" which provides a null point in the center position of ball plug 40 (not shown). Such a shape can be useful, for example, in split range pneumatic control applications.

A particularly useful aspect of valve 10 is that the action thereof can be changed from normally open to normally closed simply by removing seat assembly 16 from body reversing it end to end, and reinserting the seat assembly in the body. Also, the flow response characteristic can be changed simply by replacing seat assembly 16 with a different seat assembly or by replacing inner shell 52 with another shell having an aperture 24' of a different shape.

Ball plug 40 can be replaced with plugs of other shapes; however, the ball shape has very low friction. Leakage rate will depend on how closely ball plug 40 fits against the inner periphery of inner shell 52.

Calibration of fluid flow rate is accomplished by turning adjustment screw 32 (FIG. 1). This feature is particularly advantageous when valve 10 is used with an actuator which is itself not calibratible, such as is the case with a thermal bulb actuator, for example.

Materials of construction of valve 10 can be any suitable for the service for which the valve is intended. Construction is simple and economical, with only the forming of aperture 24" and the fitting of plug ball 40 requiring any degree of precision.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A fluid flow valve, comprising:
   (a) an elongate body having an axially extending cavity defined therethrough and having fluid inlet and outlet ports;
   (b) a hollow seat assembly disposed in said body for the passage therethrough of a fluid;
   (c) a shaped first aperture defined through a wall portion of said seat assembly; and
   (d) plug means selectively axially moveable in said hollow seat assembly and along said shaped first aperture such that said fluid flows into said hollow seat assembly, upwards along a surface of said plug means into said first aperture, through said first aperture, downwards along a surface of said plug means, and out of said hollow said seat assembly, the position said plug means along said aperture determining the rate of flow of said fluid through said valve.

2. A fluid flow valve, as defined in claim 1, further comprising first and second sealing means disposed on either end of said first aperture to seal said seat assembly against an inner peripheral surface of said cavity.

3. A fluid flow valve, as defined in claim 1, wherein said seat assembly is axially moveable in said cavity and is held in a selected position within said cavity between biasing means compressed between a first end of said cavity and a first end of said seat assembly and adjustment means bearing against a second end of said seat assembly.

4. A fluid flow valve, as defined in claim 3, wherein said adjustment means is threadedly engaged in a portion of said cavity so that said adjustment means can be selectively axially positioned in said cavity to thereby axially adjust said seat assembly within said cavity.

5. A fluid flow valve, as defined in claim 3, wherein said second end of said seat assembly and a contacting inner face of said adjustment means are serrated to secure said adjustment screw and said seat assembly in place against vibration and other mechanical forces which might otherwise tend to change axial positions of said adjustment screw and said seat assembly.

6. A fluid flow valve, as defined in claim 5, wherein said first end of said seat assembly bearing against said biasing means is serrated.

7. A fluid flow valve, as defined in claim 1, wherein said plug means comprises a close fitting ball plug.

8. A fluid flow valve, as defined in claim 7, wherein said ball plug is fixedly attached to an actuating rod which extends axially from an end of said body.

9. A fluid flow valve, as defined in claim 1, wherein said seat assembly comprises nested outer and inner cylindrical shells, said outer and inner shells having defined therethrough, respectively, second and third aligned apertures together comprising said first aperture, with said second aperture being wider and longer than, and extending beyond the outer limits of, said third aperture.

10. A fluid flow valve, as defined in claim 9, wherein said outer shell is relatively thick and said inner shell is relatively thin and said third aperture is formed using precision forming techniques.

11. A fluid flow valve, as defined in claim 1, wherein said first aperture has a generally triangular shape.

12. A fluid flow valve, as defined in claim 1, wherein said first aperture has a shape generally in the form of two triangles joined at apexes thereof so as to form a fluid flow null point therebetween when said plug means is positioned at said joined apexes.

* * * * *